United States Patent [19]
Dormer et al.

[11] Patent Number: 5,111,737
[45] Date of Patent: May 12, 1992

[54] WRIST PIN RETAINER FOR BLIND ASSEMBLY

[75] Inventors: Michael J. Dormer, Fabius; Bruce A. Fraser, Manlius; Timothy V. Nelson, Nedrow, all of N.Y.

[73] Assignee: Carrier Corporation, Syracuse, N.Y.

[21] Appl. No.: 681,594

[22] Filed: Apr. 8, 1991

[51] Int. Cl.⁵ .............................................. F16J 1/14
[52] U.S. Cl. ...................................... 92/187; 403/155
[58] Field of Search .................... 92/187, 208, 216; 403/154, 155; 74/579 E

[56] References Cited

U.S. PATENT DOCUMENTS

| | | | |
|---|---|---|---|
| 1,922,707 | 8/1933 | Newcomb | 403/154 |
| 2,213,884 | 9/1940 | Ohmart | 403/155 |
| 2,343,719 | 3/1944 | Ulrich | 92/187 |
| 2,663,601 | 12/1953 | Dubberley | 403/155 |
| 2,690,940 | 10/1954 | Calling et al. | 403/155 |

FOREIGN PATENT DOCUMENTS 400492  6/1932  United Kingdom ............... 403/155

Primary Examiner—Edward K. Look
Assistant Examiner—Hoang Nguyen

[57] ABSTRACT

A wrist pin and wrist pin retainer are combined in a subassembly which prevents inadvertent removal of the retainer from the assembly. The subassembly is placed in a bore defined by a piston and a connecting rod with at least one annular groove formed in the bore. When the subassembly is located in the bore, the retainer co-acts with the annular groove to secure the wrist pin in the bore.

3 Claims, 2 Drawing Sheets

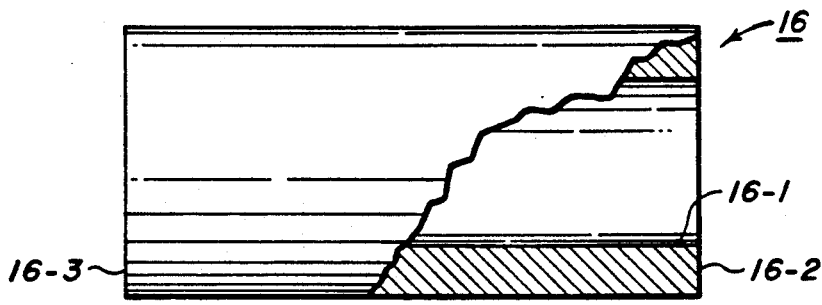
FIG. 3
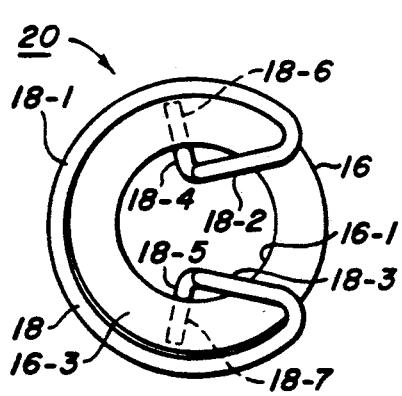
FIG. 5
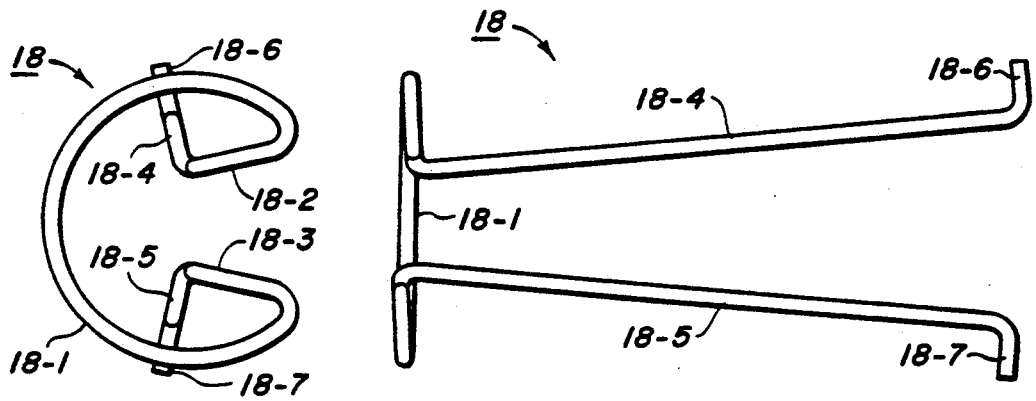
FIG. 4
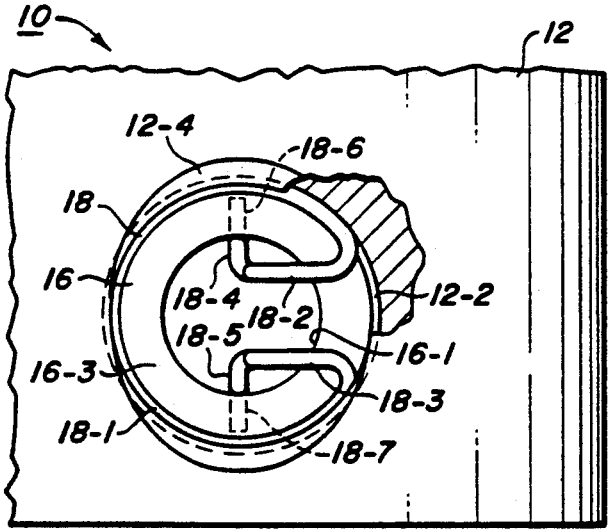
FIG. 6
FIG. 7

WRIST PIN RETAINER FOR BLIND ASSEMBLY

BACKGROUND OF THE INVENTION

In reciprocating devices such as pumps, compressors and engines, pistons are driven or drive a crankshaft. Specifically, a crank located on the crankshaft coacts with a connecting rod which is connected to a piston through a wrist pin. The piston is intended to only have reciprocating movement in its bore while the crankshaft and its crank(s) are intended to rotate. As a result, the crankshaft and crank rotate within the connecting rod which is moved thereby and the wrist pin provides a pivoted connection between the piston and piston rod. In assembling such reciprocating devices it is common to have a blind assembly of some of the members. For wrist pins, assembly involves placing them in a diametrical bore in the piston with a diametrical bore in the connecting rod forming a continuous bore with the diametrical piston bore. Circumferential grooves are formed at the ends of the diametrical piston bore and the wrist pin such that snap rings can be placed over the ends of the wrist pin and into the circumferential grooves and thereby prevent radial movement of the wrist pin. In such an assembly, it is not uncommon for a snap ring or the like to be dropped and fall into the device. Retrieval, if possible, often takes a significant amount of time while the continued presence of the loose part in an assembled device may cause failure of the device.

SUMMARY OF THE INVENTION

A wrist pin retainer is placed in a wrist pin so as to form a subassembly therewith. Specifically, the retainer is located in a bore in the wrist pin such that the retainer extends through the bore at each end so as to be secured therein. The resulting subassembly is inserted in a bore defined by a piston and a connecting rod and the retainer coacts with a groove in the bore so as to axially secure the wrist pin with respect to the bore.

It is an object of this invention to eliminate the use of loose fasteners in assembly.

It is another object of this invention to eliminate the dropping of small parts during assembly.

It is a further object of this invention to provide a wrist pin and retainer subassembly. These objects, and others as will become apparent hereinafter, are accomplished by the present invention.

Basically, a wrist pin and wrist pin retainer are combined in a subassembly preventing inadvertent displacement of the retainer from the subassembly. The subassembly is then placed in a bore defined by a piston and a connecting rod with at least one annular groove formed in the bore. When the subassembly is inserted in the bore the retainer coacts with the annular groove to secure the wrist pin in the bore and thereby rotatably connect the piston and the connecting rod.

BRIEF DESCRIPTION OF THE DRAWINGS

For a fuller understanding of the present invention, reference should now be made to the following detailed description thereof taken in conjunction with the accompanying drawings wherein;

FIG. 3 is a partially cutaway view of a wrist pin;

FIG. 4 is a side view of a wrist pin retainer;

FIG. 5 is an end view of the wrist pin retainer of FIG. 4;

FIG. 6 is an end view of the wrist pin subassembly corresponding to FIG. 5; and

FIG. 7 is a partially cutaway view of a portion of the piston assembly of FIG. 1 as viewed from the left in FIG. 1.

DESCRIPTION OF THE PREFERRED EMBODIMENT

Figure 1:
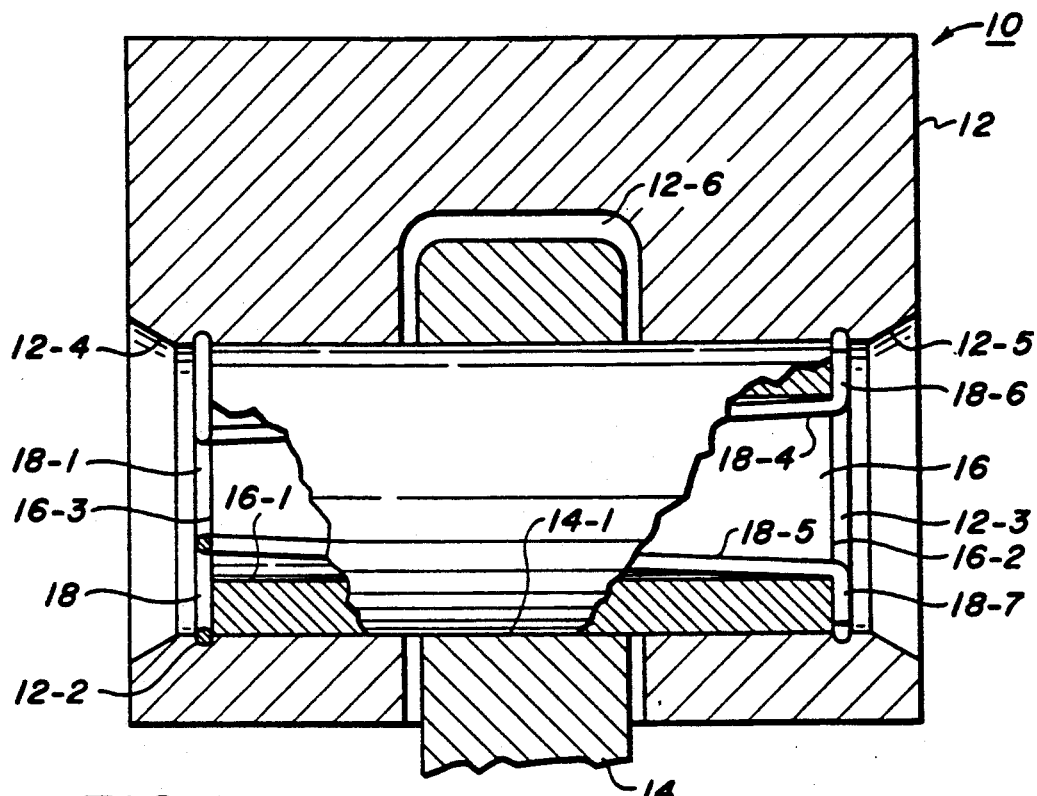
FIG. 1 is a partially cutaway sectional view of a piston assembly employing the present invention.
Figure 2:
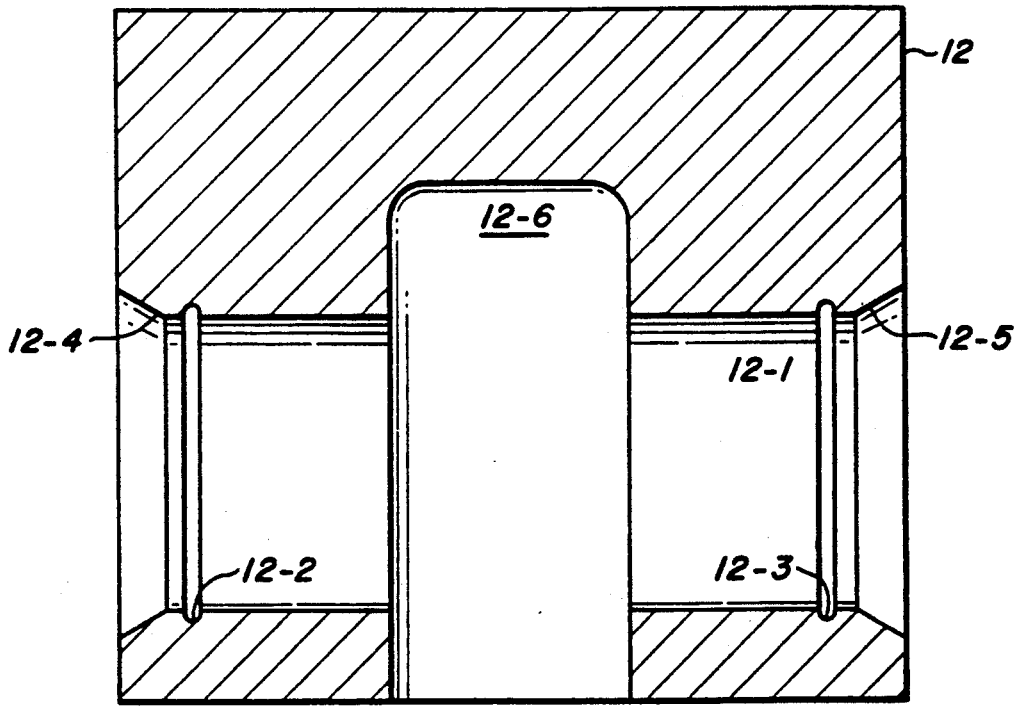
FIG. 2 is a sectional view of a piston.

In FIG. 1, the numeral 10 generally designates a piston assembly such as may be part of a reciprocating pump, compressor or engine. Piston assembly 10 includes a piston 12 and a connecting rod 14 which is pivotably connected to piston 12 by wrist pin 16. The piston assembly is secured together by wrist pin retainer 18. Referring specifically to FIG. 2, piston 12 is of a generally cylindrical configuration with a diametrical bore 12-1 formed therein. Bore 12-1 is bisected by axially extending recess 12-6 and the ends of bore 12-1 are defined by inwardly converging chamfers 12-4 and 12-5, respectively. Annular grooves 12-2 and 12-3, respectively, are located in bore 12-1 near the ends and at a spacing at least as great as the axial length of wrist pin 16. Referring now to FIG. 3, it will be noted that wrist pin 16 is formed as an annular cylinder with an axial bore 16-1 and having annular end surfaces 16-2 and 16-3, respectively.

As best shown in FIGS. 4 and 5, wrist pin retainer 18 is made of music wire and has a C-shaped section 18-1 approximately 270° in extent which is generally coplanar with generally radially extending legs 18-2 and 18-3. Radially extending legs 18-2 and 18-3 are connected to diverging, generally axially extending legs 18-4 and 18-5, respectively, which are, in turn, connected to radially extending feet 18-6 and 18-7. In assembling the wrist pin subassembly 20 legs 18-2 and 18-3 and/or legs 18-4 and 18-5 are squeezed together so as to permit feet 18-6 and 18-7 to be inserted in bore 16-1. Feet 18-6 and 18-7 are pushed through bore 16-1 so that the resiliency of the retainer 18 causes feet 18-6 and 18-7 to move outwardly so as to overlie annular end surface 16-2 whereby removal of retainer 18 from bore 16-1 is resisted. Referring now to FIGS. 5 and 6 it will be noted in going from the unstressed position of FIG. 5 to the assembled position of wrist pin subassembly 20 of FIG. 6, there is no significant change in the shape of retainer 18.

Wrist pin subassembly 20 is placed in a continuous bore defined by bores 12-1 and 14-1 such that feet 18-6 and 18-7 enter the bore first. Feet 18-6 and 18-7, as best shown in FIG. 1, do not extend to the outer circumference of wrist pin 16 so that wrist pin subassembly 20 freely enters the bore defined by bores 12-1 and 14-1. Because C-shaped section 18-1 extends radially outward of annular end surface 16-3, as clearly shown in FIG. 6, it represents an interference fit with bore 12-1. When wrist pin subassembly 20 is inserted in the bore defined by bores 12-1 and 14-1 to the point where C-shaped section 18-1 engages chamfer 12-4 or 12-5, depending upon the directions of assembly, further insertion of the subassembly requires deformation of retainer 18. As the wrist pin subassembly 20 is pushed further into the bore there is a stretching/deformation as legs 18-2 and 18-3 are drawn into bore 16-1 causing section 18-1 to be drawn in circumferentially and cammed inwardly by chamfer 12-5. C-shaped section 18-1 will be drawn in circumferentially and into bore 16-1 until it reaches the annular groove 12-2 or 12-3 depending upon the direction of insertion, whereupon C-shaped section 18-1 will expand circumferentially and, if permitted, subassembly 20 will move towards C-shaped section 18-1 so that annular surface 16-3 is in engagement therewith. When so assembled, C-shaped section 18-1 coacts with either annular groove 12-2 or 12-3 in the manner of a conventional snap ring. Referring specifically to FIG. 7, when subassembly 20 is in place in piston assembly 10, the angle formed by radially extending legs 18-2 and 18-3, as compared to FIGS. 5 and 6 is reduced with a resultant extension of C-shaped section 18-1 over a greater circumference.

Although preferred embodiment of the present invention has been illustrated and described, other changes will occur to those skilled in the art. It is therefore intended that the scope of the present invention is to be limited only by the scope of the appended claims.

What is claimed is:

1. A piston assembly comprising:
   piston means having a diametrically extending bore formed therein and at least one annular groove formed in said bore;
   connecting rod means adapted to be received in said piston means and having a bore formed therein which is continuous with said bore in said piston means when said connecting rod means is received in said piston means;
   wrist pin means having a bore and defining an annular cylinder adapted to be received in said continuous bore defined by said piston means and said connecting rod means; and
   a retainer means defined by a single wire located in said bore of said wrist pin means and extending therethrough so as to be retained therein and including a curved portion located outside of said bore in said wrist pin means and coacting with said annular groove when said wrist pin means is in said continuous bore whereby said connecting rod means is pivotably connected to said piston means.

2. A piston assembly comprising:
   piston means having a diametrically extending bore formed therein and at least one annular groove formed in said bore;
   connecting rod means adapted to be received in said piston means and having a bore formed therein which is continuous with said bore in said piston means when said connecting rod means is received in said piston means;
   wrist pin means having a bore and defining an annular cylinder adapted to be received in said continuous bore defined by said piston means and said connecting rod means; and
   retainer means located in said bore of said wrist pin means and extending therethrough so as to be retained therein and including a C-shaped portion and two generally radially extending legs which are generally in a plane with said C-shaped portion, a second portion including a pair of generally axially directed legs located in said bore of said wrist pin means, and a third portion including a pair of generally radially directed feet connected to said axially directed legs and located outside of said bore of said wrist pin means said C-shaped portion being located outside of said bore in said wrist pin means and coacting with said annular groove when said wrist pin means is in said continuous bore whereby said connecting rod means is pivotably connected to said piston means.

3. A method of assembling a piston assembly comprising the steps of:
   deforming and placing a retainer means into the bore of a wrist pin means such than an end of said retainer means extends from each end of the bore in the wrist pin and is held therein to thereby define a wrist pin subassembly;
   locating a portion of a connecting rod means within a piston means whereby a bore in said piston means and a bore in said connecting rod means defines a continuous bore with said continuous bore having at least one annular groove formed therein;
   placing said wrist pin subassembly entirely within said continuous bore such that one end of said retainer means coacts with said one annular groove to secure said wrist pin subassembly within said continuous bore.

* * * * *